(12) United States Patent
Leavitt

(10) Patent No.: US 10,168,002 B2
(45) Date of Patent: Jan. 1, 2019

(54) BREATHER LAYER FOR EXHAUSTING PERMEATE FROM PRESSURE VESSELS

(71) Applicant: Quantum Fuel Systems LLC, Lake Forest, CA (US)

(72) Inventor: Mark Leavitt, Laguna Hills, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 510 days.

(21) Appl. No.: 14/931,367

(22) Filed: Nov. 3, 2015

(65) Prior Publication Data

US 2016/0053945 A1 Feb. 25, 2016

Related U.S. Application Data

(63) Continuation of application No. 13/979,531, filed as application No. PCT/US2011/061695 on Nov. 21, 2011, now Pat. No. 9,205,373.

(Continued)

(51) Int. Cl.
| | |
|---|---|
| *B29C 70/32* | (2006.01) |
| *F17C 11/00* | (2006.01) |
| *F17C 1/16* | (2006.01) |
| *F17C 13/00* | (2006.01) |
| *B01D 53/22* | (2006.01) |

(Continued)

(52) U.S. Cl.
CPC .............. *F17C 11/00* (2013.01); *B01D 53/22* (2013.01); *B01D 53/228* (2013.01); *B01D 69/12* (2013.01); *F17C 1/00* (2013.01); *F17C 1/16* (2013.01); *F17C 13/00* (2013.01); *F17C 2201/0109* (2013.01); *F17C 2201/056* (2013.01); *F17C 2203/0604* (2013.01); *F17C 2203/0621* (2013.01); *F17C 2203/0624* (2013.01); *F17C 2203/0663* (2013.01); *F17C 2205/0305* (2013.01); *F17C 2260/037* (2013.01); *F17C 2260/038* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 5,419,139 A | 5/1995 | Blum | |
| 2006/0096993 A1* | 5/2006 | Takashima | F17C 1/06 220/588 |

(Continued)

FOREIGN PATENT DOCUMENTS

| | | | |
|---|---|---|---|
| GB | 995684 A | * | 6/1965 |
| JP | 2008261414 | | 10/2008 |
| RU | 2117853 C1 | * | 8/1998 |

OTHER PUBLICATIONS

Machine Translation RU (Soviet Union) 2117853, Date Unknown.*

*Primary Examiner* — Jeffry H Aftergut
(74) *Attorney, Agent, or Firm* — Baker & Hostetler LLP

(57) ABSTRACT

Devices and methods for addressing permeation of a gas through a liner of a pressure vessel involve a porous layer between the liner and a composite shell of the pressure vessel around the liner. The porous layer provides fluid communication with atmosphere for gases that permeate through the liner. Such porous layers may be provided in a continuous wound set of fibers about the liner. Further, an inner composite structure may be provided between the liner and the porous layer to reduce the rate of permeation to the porous layer.

7 Claims, 7 Drawing Sheets

Related U.S. Application Data

(60) Provisional application No. 61/417,790, filed on Nov. 29, 2010.

(51) Int. Cl.
*F17C 1/00* (2006.01)
*B01D 69/12* (2006.01)

(56) References Cited

U.S. PATENT DOCUMENTS

| | | | |
|---|---|---|---|
| 2009/0057319 A1* | 3/2009 | Schlag | B29C 41/04 220/586 |
| 2009/0308874 A1 | 12/2009 | Cronin et al. | |
| 2009/0314785 A1 | 12/2009 | Lindner et al. | |
| 2010/0072209 A1 | 3/2010 | Hatta | |
| 2012/0048865 A1 | 3/2012 | Eihusen et al. | |

\* cited by examiner

BREATHER LAYER FOR EXHAUSTING PERMEATE FROM PRESSURE VESSELS

CROSS REFERENCE TO RELATED APPLICATIONS

This application is a continuation of U.S. patent application Ser. No. 13/979,531, filed on Sep. 10, 2013, which is a national stage entry under 35 U.S.C. § 371(c) of International Patent Application No. PCT/US2011/061695, filed Nov. 21, 2011, and claims priority from U.S. Provisional Patent Application Ser. No. 61/417,790, filed Nov. 29, 2010. The contents of all of these applications are incorporated by reference herein in their entirety for all purposes.

BACKGROUND

This disclosure relates to high pressure storage devices and processes of manufacture. More particularly, this disclosure relates to improved methods of fabricating composite pressure vessels with structure for releasing gasses permeating through portions thereof.

DESCRIPTION

According to some exemplary implementations, disclosed is a pressure vessel, comprising: a liner; a porous layer covering substantially all of the liner; a polymeric layer covering the porous layer; and a composite shell covering the polymeric layer.

The porous layer may be in fluid communication with atmosphere at an exit location. The exit location may be provided at a polar end of the pressure vessel.

Each of the porous layer, the polymeric layer; and the composite shell may be of a single set of continuous wrapped fibers forming overlapping helical patterns. The porous layer may form a helical pattern of a continuous set of fibers that crosses over itself at any given portion thereof. The porous layer material may be one or more of metal, glass, carbon, and aramid. The polymeric layer may be one of plastic, rubber films and RTV rubbers.

According to some exemplary implementations, disclosed is a pressure vessel, comprising: a liner; an inner composite structure covering the liner; an inner polymeric layer covering the inner composite structure; a porous layer covering the inner polymeric layer; an outer polymeric layer covering the porous layer; and a composite shell covering the polymeric layer.

The porous layer may be in fluid communication with atmosphere at an exit location. The exit location may be provided at a polar end of the pressure vessel.

The inner composite structure may further comprise micro-channels providing fluid communication between the liner and the inner polymeric layer. The inner composite structure may be thinner than the composite shell. The porous layer material may be one or more of metal, glass, carbon, and aramid. The inner polymeric layer and the outer polymeric layer may be one of plastic, rubber films and RTV rubbers. Each of the inner composite structure, the inner polymeric layer, the porous layer, the outer polymeric layer, and the composite shell may be of a single set of continuous wrapped fibers forming overlapping helical patterns.

According to some exemplary implementations, disclosed is a process for producing a pressure vessel, comprising: providing a liner; filament winding a porous layer about substantially all of the liner; providing a polymeric layer about the porous layer; and wrapping a composite shell about the polymeric layer.

Filament winding a porous layer may further comprise: wrapping a continuous set of fibers in a helical pattern whereby the continuous set of fibers repeatedly crosses over itself.

According to some exemplary implementations, disclosed is a process for producing a pressure vessel, comprising: providing a liner; wrapping an inner composite structure about the liner; providing an inner polymeric layer about the inner composite structure; wrapping a porous layer about the inner polymeric layer; providing an outer polymeric layer about the porous layer; and wrapping a composite shell about the outer polymeric layer.

According to some exemplary implementations, disclosed is a method, comprising: receiving a permeate gas through a liner of a pressure vessel; directing the permeate gas to a porous layer covering the liner and covered by a composite shell, wherein said permeate gas at a low pressure relative to a pressure within the liner is collected and directed to a predetermined exit location on said pressure vessel.

The porous layer may be a single set of continuous wrapped fibers forming overlapping helical patterns. Receiving the permeate gas through the liner of the pressure vessel may further comprise: receiving the permeate gas through an inner composite structure disposed about the liner.

DRAWINGS

The above-mentioned features of the present disclosure will become more apparent with reference to the following description taken in conjunction with the accompanying drawings wherein like reference numerals denote like elements and in which.

FURTHER DESCRIPTION

Gaseous storage pressure vessels with polymeric liners and fiber reinforced composite structures have been used as reliable, highly efficient vessels. These vessels have advantages over other vessel designs based on weight efficiency, corrosion resistance, and fatigue performance. The polymeric liner acts as a non-load bearing gas barrier.

Polymers are more susceptible to permeation of gases than metallic tanks/liners. This permeation travels from high pressure areas to low pressure areas. This migration may cause accumulation of gas between the polymer liner and the composite shell. Accumulation of gas in this region can result in at least one of these phenomena: (1) higher expulsion of gas as the tank is pressurized and this accumulated gas is pushed out of the tank structure—sometimes referred to as a "dynamic gas release"—and (2) induced buckling of the liner inward as the pressure between the liner and the shell exceeds the internal pressure of the tank when the tank is depressurized. Further, managing permeation of gasses may prevent erroneous detection of pressure conditions that, if actually occurring, would interfere with normal operation of a system employing the pressure vessel.

A breather layer of a pressure vessel provides a path from the inner layers of the composite pressure vessel to a polar end of the vessel. This layer prevents sealing of the polar end fittings from sealing gas between the polar fittings and the composite structure. A breather layer also manages release of $H_2$ (or other gases) to a region remote from sensors, thereby managing and/or reducing incidence of false positive sensing events.

As used herein, "set of fibers" means a plurality of fibers placed along a single, continuous path.

As used herein, "filament wrap" is a continuous set of fibers provided to an object by filament winding.

As used herein, "filament winding" means winding or wrapping a continuous set of fibers about an object so as to cover the object with multiple passes between polar ends of the object, whereby the continuous set of fibers crosses over itself.

As used herein, "continuous wrap" means an uninterrupted wrap of more than one full rotation around an object.

Figure 1:
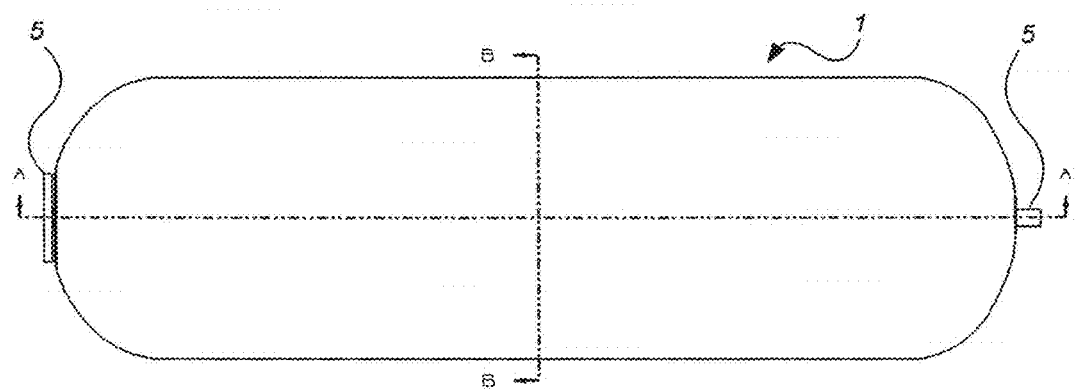
FIG. 1 shows a view of an implementation of a pressure vessel.
Figure 2:
FIG. 2 shows a sectional view of an implementation of a layered pressure vessel, as taken across line A-A of FIG. 1.
Figure 3:
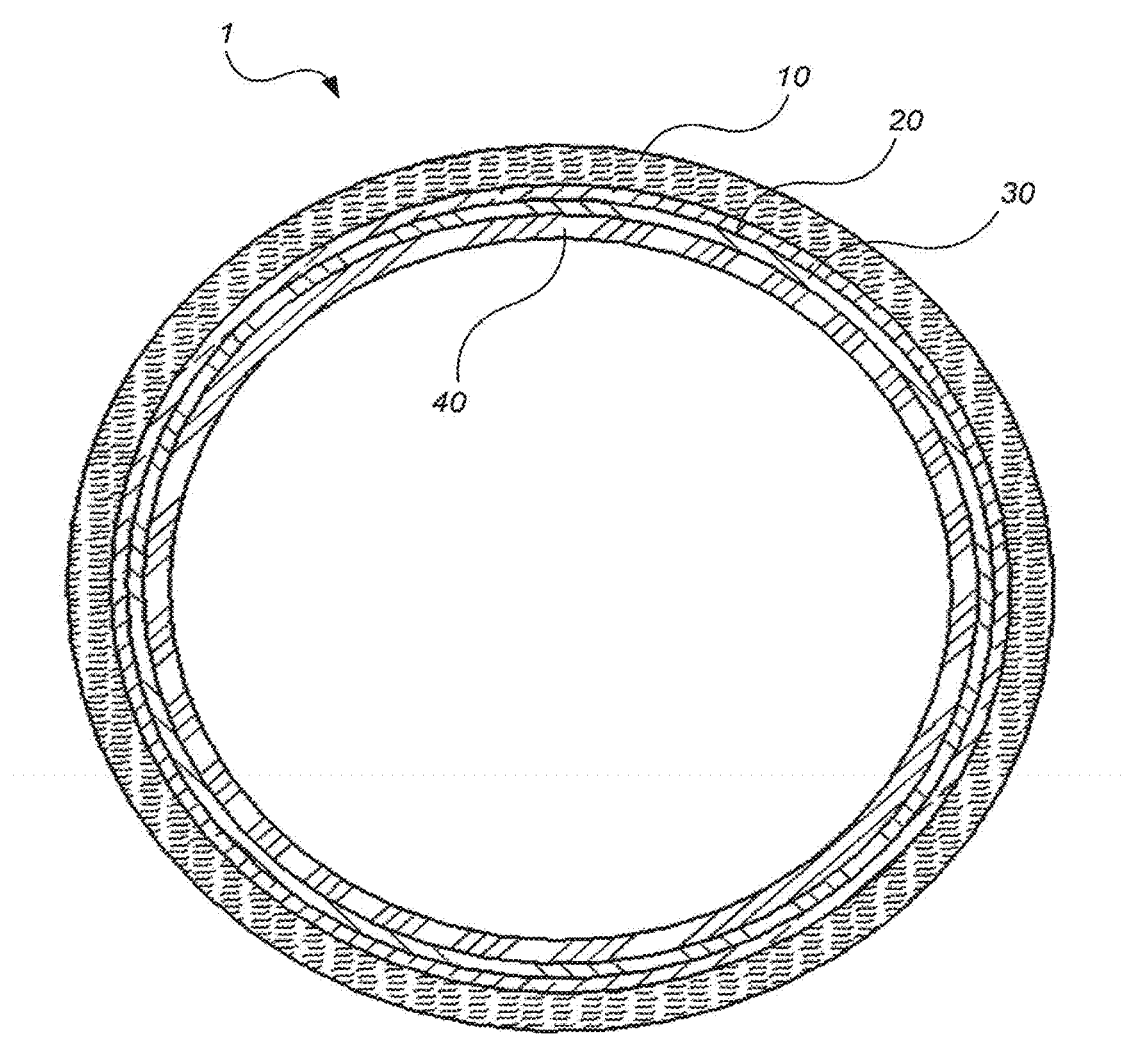
FIG. 3 shows a sectional view of an implementation of a layered pressure vessel, as taken across line B-B of FIG. 1.

As shown in FIG. 1, pressure vessel 1 may include polar end fittings 5 and be configured to store pressurized gasses. As shown in FIGS. 2 and 3, pressure vessel 1 may include a plurality of layers provided about liner 40, which defines an inner compartment within which gasses may be stored at high pressures.

According to some exemplary implementations, as shown in FIGS. 3, 4, 5, and 6, a breather layer includes polymeric layer 20 and porous layer 30. The breather layer is disposed between liner 40 and composite shell 10 of pressure vessel 1. Porous layer 30 accepts a permeate through liner 40 and allows it to vent freely from pressure vessel 1 at exit location 7. Exit location 7 may be disposed at a polar end of pressure vessel 1. Venting from pressure vessel 1 prevents accumulation of gas between liner 40 and composite shell 10 as well as absorption of the same into composite shell 10.

The shape and size of pressure vessel 1 may be substantially defined by a liner assembly and layers provided there upon. A liner assembly may comprise liner 40 and polar fittings 5, including at least one of a polar boss and a blind boss. High-pressure storage vessels may be made by wrapping fiber composites around liner 40, which is used as a mandrel.

According to some exemplary implementations, composite shell 10 provides support to liner 40 against deformation and rupture due to pressure from within liner 40. Composite shell 10 may be of a filament wrap comprising a filament wound fiber and a resin. The filament wound fiber may comprise at least one inorganic or organic fiber. The inorganic or organic fiber may comprise at least one of carbon, glass, basalt, boron, aramid, Kevlar, high-density polyethylene (HOPE), and nylon. According to some exemplary implementations, the filament wrap may form a continuous wrap around more than one full rotation of liner 40, inter alia, about its principal axis or along more than one longitudinal length of liner 40, inter alia. The filament wrap may form a general layer around liner 40, inter alia, such that the entirety of liner 40, inter alia, is covered to provide support against high pressure within liner 40. Incorporated herein by reference is U.S. application Ser. No. 12/468,736, entitled "High Pressure Storage Device and Method" and filed May 19, 2009.

Figure 4:
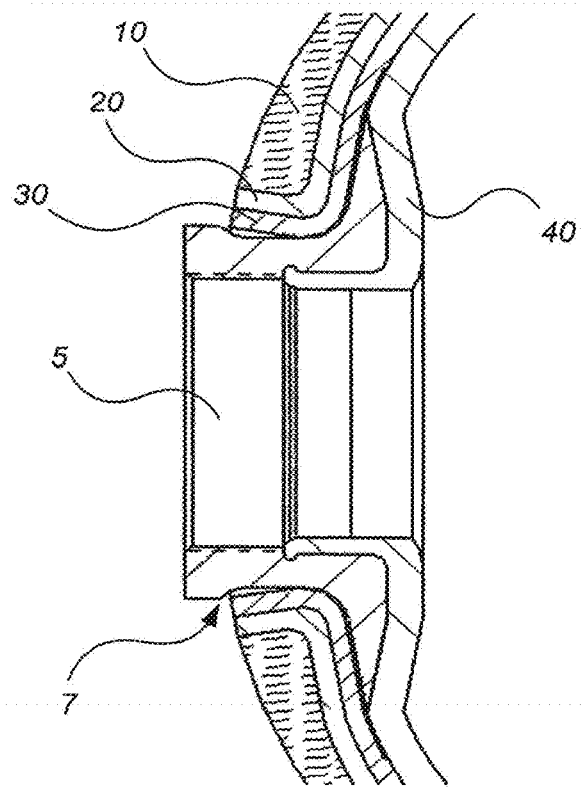
FIG. 4 shows a sectional view of an implementation of a layered pressure vessel at a polar end thereof.
Figure 5:
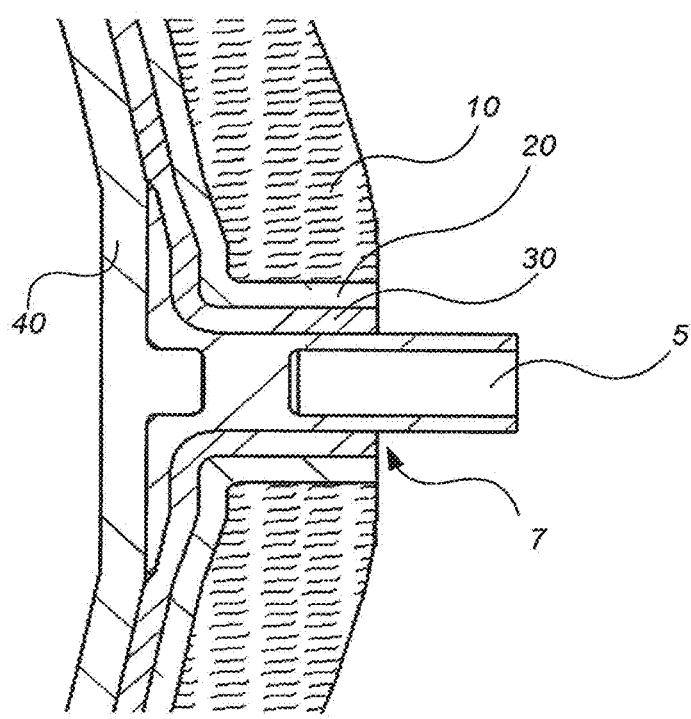
FIG. 5 shows a sectional view of an implementation of a layered pressure vessel at a polar end thereof.

According to some exemplary implementations, porous layer 30 provides one or more pathways about and across pressure vessel 1. For example, as shown in FIGS. 4 and 5, areas near polar ends 5 of pressure vessel 1 may be in fluid communication with porous layer 30. According to some exemplary implementations, porous layer 30 supports the structure of pressure vessel 1, including adjacent layers, such as liner 40 and polymeric layer 20. For example, porous layer 30 may be substantially incompressible once applied, wherein porous layer 30 maintains its structure and porosity while withstanding pressure cycling. Where porous layer 30 is disposed between liner 40 and composite shell 10, porous layer 30 must maintain its porosity as pressure is transferred from liner 40 from within the pressure vessel. By further example, porous layer 30 may conform to surfaces as it is being applied. This feature allows porous layer 30 to avoid or minimize wrinkles and aberrations, and thereby maintain or provide a substantially even profile and distribution for interfacing with adjacent layers.

Porous layer 30 allows a flow of gases from gaseous storage tank and also withstands high compressive loads (e.g., up to 1.5 times service pressure). Porous layer 30 may have high fatigue life, be resistive to corrosion (e.g., induced by automotive fluid, etc.), and conform easily to pressure vessel shape.

Figure 7:
FIG. 7 shows a view of an implementation of a porous layer of a pressure vessel.

According to some exemplary implementations, as shown in FIG. 7, porous layer 30 is of wound fibers (i.e., a filament wrap). For example, porous layer 30 may be applied as a single, continuous set of fibers wrapped in a helical pattern. The helical pattern crosses liner 40 at an oblique angle relative to the longitudinal axis of the pressure vessel and turns when it reaches a polar end to form a return path that overlaps the portion formed prior to the turn. According to some exemplary implementations, any given portion of porous layer 30 includes at least two overlapping layers of the same continuous set of fibers. Such filament wrapping may be provided to a pressure vessel having a cylindrical central portion and generally hemispherical domes at ends of the cylindrical central portion. Similar configurations providing smooth transitions are contemplated to provide a surface for receiving filament wrapping.

According to some exemplary implementations, porous layer 30 covers the entire surface of liner 40 that permits permeation. According to some exemplary implementations, porous layer 30 does not cover the entire surface of liner 40. For example, some gaps within porous layer 30 may be insignificant for the structural integrity of the vessel and may still provide flow paths for the gas connecting to one or both polar ends 5 of pressure vessel 1. Accordingly, gas flow paths may be provided through one or more of pores within the fibers, spaces between the fibers, and spaces between sets of fibers.

According to some exemplary implementations, porous layer 30 is of materials providing the characteristics disclosed herein. For example, porous layer 30 may contain fibers of glass (e.g., fiberglass, E-glass, etc.), carbon, aramid, nylon, rayon, other textile fibers, or combinations thereof.

According to some exemplary implementations, porous layer 30 is sufficiently thick to provide flow paths to polar ends 5 of pressure vessel 1. Porous layer 30 thicknesses of about 0.002 inches has shown effective flow paths of permeated gas. Both thinner and thicker porous layers 30 are contemplated. As the constituent gasses are typically atomic or molecular in scale, thin porous layers 30 may provide effective flow paths. Accordingly, figures provided herewith are not necessarily to scale and are intended illustrate features. For example, to reduce material and manufacturing cost, layers are provided with thinness that provides desired performance characteristics, as disclosed further herein.

According to some exemplary implementations, porous layer 30 is isolated from composite shell 10 by polymeric layer 20. Polymeric layer 20 protects at least portions of porous layer 30 from being saturated during manufacture where resin is used to form composite shell 10. Such saturation could otherwise seal flow paths for the permeated gas. Polymeric layer 20 further provides a barrier to resist gas flow beyond porous layer 30 and into composite shell 10.

According to some exemplary implementations, polymeric layer 20 is a thermoplastic or a thermoset polymer. For example, polymeric layer 20 may be of plastic, rubber films or vulcanized rubber. Further examples include polypropylene, polyethylene, and room-temperature vulcanizing ("RTV") rubbers, a foam layer, etc. Polymeric layer 20 may be compatible with and combined with one or more of epoxy, polyester, vinyl ester, urethane resin system, and the like, and can be filament wound over. According to some exemplary implementations, polymeric layer 20 is formed by a process to provide a continuous covering over porous layer 30. Such processes may include wrapping, winding, heating, sintering, molding, etc.

According to some exemplary implementations, polymeric layer 20 covers the entire surface of porous layer 30. According to some exemplary implementations, polymeric layer 20 does not cover the entire surface of porous layer 30. For example, some gaps within polymeric layer 20 may allow materials from composite shell 10 to penetrate or block portions of porous layer 30 and still preserve some flow paths for the gas connecting to the polar ends of the pressure vessel.

According to some exemplary implementations, porous layer 30 or other wrapped layers of pressure vessel 1 may include a conduction layer or have conductive materials included in a set of wound fibers. Such inclusions may extend from one end of pressure vessel 1 to another end. Conductive fibers or other components may be provided to any portion or layer that is electrically isolated to thereby cause any electrical charge to be alleviated rather than remain within portions of pressure vessel 1.

Figure 8:
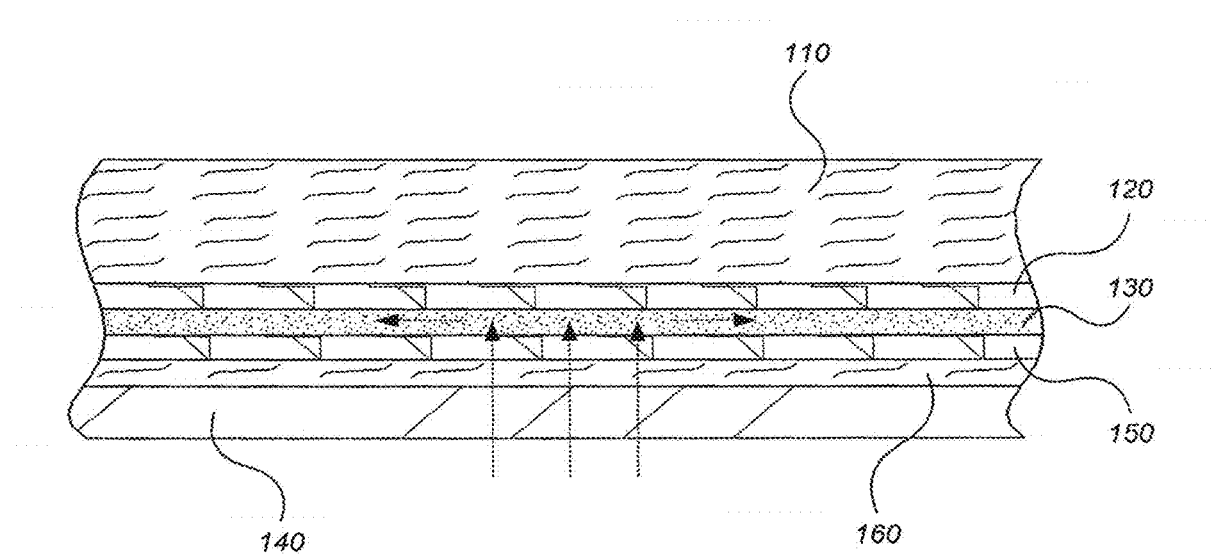
FIG. 8 shows a cross-sectional view of an implementation of a layered pressure vessel.

According to some exemplary implementations, as shown in FIG. 8, additional layers are provided. For example, pressure vessel 1 may include inner composite structure 160 between liner 140 and the breather layer (including outer polymeric layer 120, porous layer 130, and inner polymeric layer 150). Inner composite structure 160 may be of materials at least substantially similar to those of composite shell 110, forming a filament wrap comprising a filament wound fiber and a resin.

According to some exemplary implementations, inner composite structure 160 reduces the permeation levels from within liner 40 by providing an additional barrier between liner 40 composite shell 110. For example, inner composite structure 160 may be only thick enough to increase resistance of permeation to the breather layer, rather than being an exclusive or primary source of support against rupture. By further example, composite shell 110 may provide support against rupture.

Figure 9:
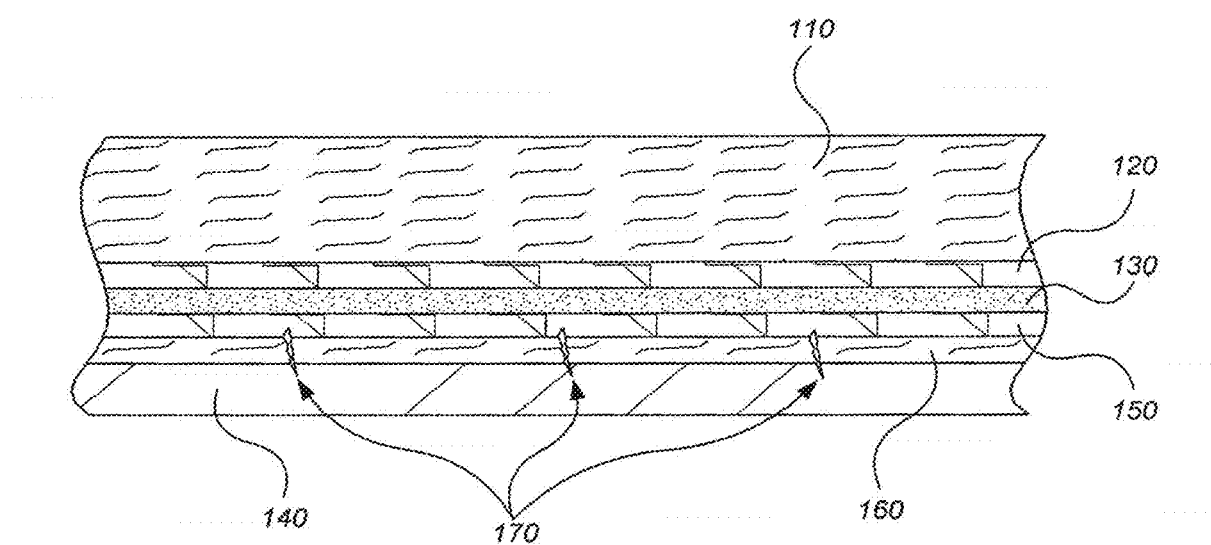
FIG. 9 shows a cross-sectional view of an implementation of a layered pressure vessel.

According to some exemplary implementations, inner composite structure 160 may permit a degree of permeation there through to alleviate pressure between inner composite structure 160 and liner 140. According to some exemplary implementations, as shown in FIG. 9, micro-channels 170 are provided to facilitate a degree of permeation across inner composite structure 160. Micro-channels 170 may occur naturally as bubbles formed during manufacture or as gaps created by stress (e.g., during pressure cycling), etc. Further, micro-channels 170 may be targeted holes provided during or after manufacture of inner composite structure 160. Micro-channels 170 may be about 0.001-0.002" in diameter, although other sizes and configurations are contemplated based on desired performance characteristics. Micro-channels 170 may extend within inner composite structure 160 or beyond into at least one of liner 140 and inner polymeric layer 150. Gas passes through inner composite structure 160 through micro cracks 170 and standard permeation characteristics of the resin matrix of composite structure 160.

According to some exemplary implementations, a balanced degree of permeation across inner composite structure 160 may be selected, programmed, and maintained for resisting permeation across inner composite structure 160 and avoiding adverse consequences of gas buildup between inner composite structure 160 and liner 140. Accordingly, micro cracks 170 or the standard permeation characteristics of the resin matrix of composite structure 160 are selected to slow permeation while avoiding induced buckling of liner 140, etc.

According to some exemplary implementations, as shown in FIGS. 8 and 9, where inner composite structure 160 is applied with wet resin, inner polymeric layer 150 may be provided covering inner composite structure 160 prior to application of porous layer 130 to reduce or prevent saturation of porous layer 130 with resin from inner composite structure 160 during manufacture.

Figure 10:
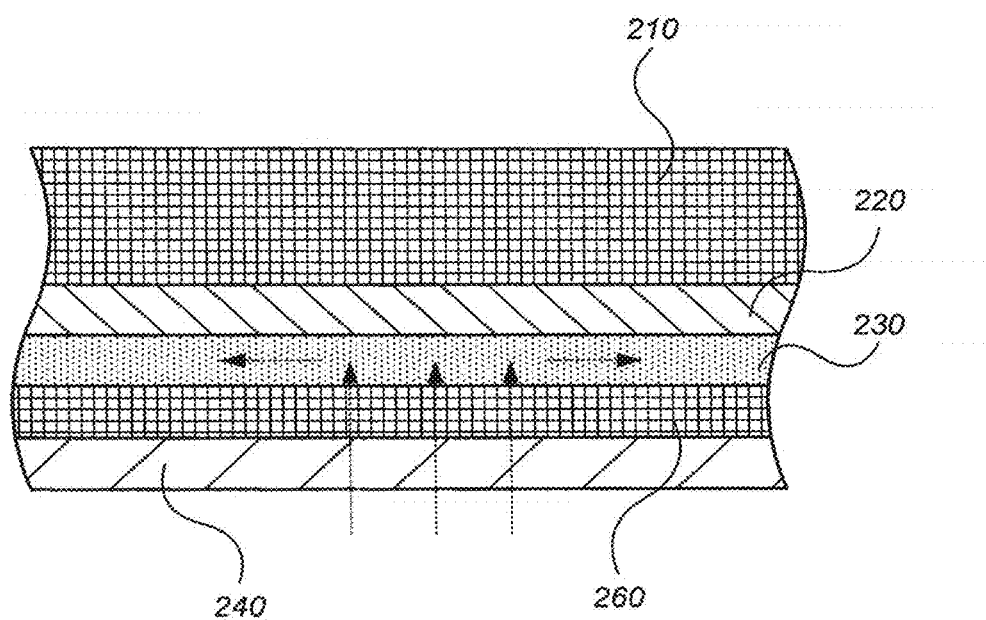
FIG. 10 shows a cross-sectional view of an implementation of a layered pressure vessel.

According to some exemplary implementations, as shown in FIG. 10, where inner composite structure 260 on liner 240 does not contain wet resin (including scenarios in which a resin is dried), porous layer 230 may be placed directly in contact with inner composite structure 260. Outer polymeric layer 220 may be provided where composite shell 210 uses wet resin in manufacture thereof.

Figure 6:
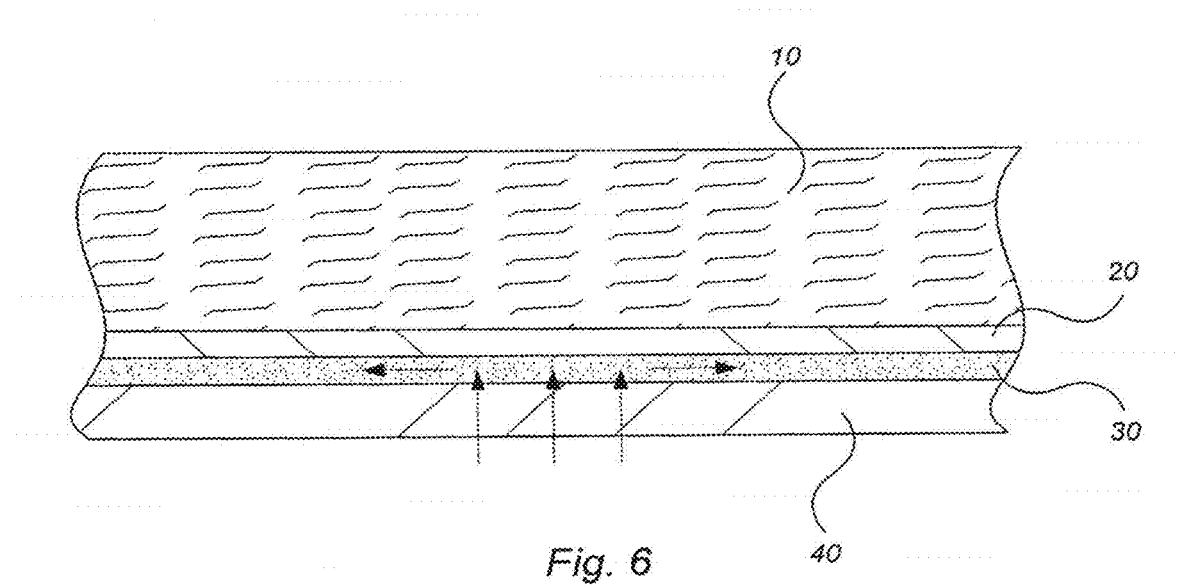
FIG. 6 shows a sectional view of an implementation of a layered pressure vessel.

According to some exemplary implementations, a process for manufacturing a pressure vessel is disclosed. A liner assembly including liner 40 and polar end fittings 5 is used as a mandrel for receiving additional layers. According to some exemplary implementations, as shown in FIG. 6, each of porous layer 30, polymeric layer 20, and composite shell 10 is provided in sequence to the liner assembly, in accordance with the disclosure herein. According to some exemplary implementations, each layer may be filament wrapped with a single set of continuous fibers in a repeating helical pattern about the pressure vessel as it rotates. Accordingly, liner 40 is covered such that permeate which migrates through liner 40 is directed to porous layer 30, as shown in FIG. 6.

According to some exemplary implementations, as shown in FIGS. 8 and 9, each of inner composite structure 160, inner polymeric layer 150, porous layer 130, outer polymeric layer 120, and composite shell 110 is provided in sequence to the liner assembly, in accordance with the disclosure herein. According to some exemplary implementations, each layer may be filament wrapped with a single set of continuous fibers in a repeating helical pattern about the pressure vessel as it rotates. Accordingly, liner 140 is covered such that permeate through liner 140 and inner composite structure 160 is directed to porous layer 130, as shown in FIGS. 8 and 9.

According to some exemplary implementations, as shown in FIG. 10, each of inner composite structure 260, porous layer 230, outer polymeric layer 220, and composite shell 210 is provided in sequence to the liner assembly, in accordance with the disclosure herein. According to some exemplary implementations, each layer may be filament wrapped with a single set of continuous fibers in a repeating helical pattern about the pressure vessel as it rotates. Accordingly, liner 240 is covered such that permeate through liner 240 and inner composite structure 260 is directed to porous layer 230, as shown in FIG. 10.

According to some exemplary implementations, pressure vessels according to the present disclosure operate as they receive gasses at high pressures. As a pressure vessel is filled and as it contains a substance at pressure greater than atmosphere, the contents of the pressure vessel will permeate through layer between the interior of the pressure vessel and a porous layer in fluid communication with atmosphere. Consequently, as shown in FIGS. 6, 8, 9, and 10, permeate traveling to the porous layer are subsequently directed to atmosphere, thereby relieving pressure between the liner and the composite shell.

According to some exemplary implementations, a breather layer also manages release of gases to a region remote from sensors. For example, sensors may be provided to sense release of gases from within the pressure vessel. Such sensors, when detecting a condition that satisfies a threshold, may activate a notice, an alarm, or an corrective or preventative action such as a shut-down sequence. By further example, where sensors are placed at a polar boss or other valve of the pressure vessel, the breather layer may be configured to release the permeate gasses to an end distal relative to the polar boss, thereby managing and/or reducing incidence of false positive sensing events.

According to some exemplary implementations, the porous layer creates a path for gas permeating the liner to exit the pressure vessel at rates equivalent to standard permeation characteristic of the liner. By preventing gas from accumulating between the liner and the composite shell, increased gas emissions is eliminated during dynamic conditions (system fills). Also by preventing of increased pressure beyond atmospheric on the external surface of the liner, buckling is eliminated at low pressure conditions inside the pressure vessel.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A process for producing a pressure vessel, comprising:
providing a liner;
wrapping an inner composite structure about the liner;
providing an inner polymeric layer about the inner composite structure;
wrapping a porous layer about the inner polymeric layer;
providing an outer polymeric layer about, the porous layer and.
wrapping a composite shell about the outer polymeric layer;
wherein each of the porous layer, the inner polymeric layer, the outer polymeric layer, and the composite shell are formed of a single set of continuous wrapped fibers forming overlapping helical patterns.

2. A method, comprising:
receiving a permeate gas through a liner of a pressure vessel,
the pressure vessel comprising an inner composite structure covering the liner, an inner polymeric layer covering the inner composite structure, a porous layer covering the inner polymeric layer, an outer polymeric layer covering the porous layer, and a composite shell covering the outer polymeric layer; and,
directing the permeate gas through micro-channels in the inner composite structure to the porous layer;
wherein said permeate gas at a low pressure relative to a pressure within the liner is collected and directed to a predetermined exit location on said pressure vessel; and,
wherein each of the inner composite structure, the porous layer, the inner polymeric layer, the outer polymeric layer, and the composite shell are formed of a single set of continuous wrapped fibers forming overlapping helical patterns.

3. The method of claim 2, wherein the porous layer is a single set of continuous wrapped fibers forming helical patterns that crosses over itself at any given portion thereof.

4. The method of claim 2, the method further comprising sensing a release of gases from within the pressure vessel.

5. The method of claim 4, the method further comprising:
detecting a condition that satisfies a threshold; and
activating one or more of a notice, an alarm, a corrective action, and a preventative action.

6. A method, comprising:
receiving a permeate gas through a liner of a pressure vessel,
the pressure vessel comprising an inner composite structure covering the liner, an inner polymeric layer covering the inner composite structure, a porous layer covering the inner polymeric layer, a porous layer covering the inner polymeric layer, an outer polymeric layer covering the porous layer, and a composite shell covering the outer polymeric layer; and,
directing the permeate gas through micro-channels in the inner composite structure to the porous layer;
wherein said permeate gas at a low pressure relative to a pressure within the liner is collected and directed to a predetermined exit location on said pressure vessel; and,
wherein each of the inner composite structure, the porous layer, the inner polymeric layer, the outer polymeric layer, and the composite shell are formed of a single set of continuous wrapped fibers forming overlapping helical patterns, wherein each of the porous layer, the inner polymeric layer, the outer polymeric layer, and the composite shell are formed of a single set of continuous wrapped fibers forming overlapping helical patterns.

7. A process for producing a pressure vessel, comprising:
providing a liner;
wrapping an inner composite structure about the liner;
providing an inner polymeric layer about the inner composite structure;
wrapping a porous layer about the inner polymeric layer;
providing an outer polymeric layer about the porous layer; and
wrapping a composite shell about the outer polymeric layer;
wherein each of the inner composite structure, the porous layer, the inner polymeric layer, the outer polymeric layer, and the composite shell are formed of a single set of continuous wrapped fibers forming overlapping helical patterns.

* * * * *